Patented June 6, 1933

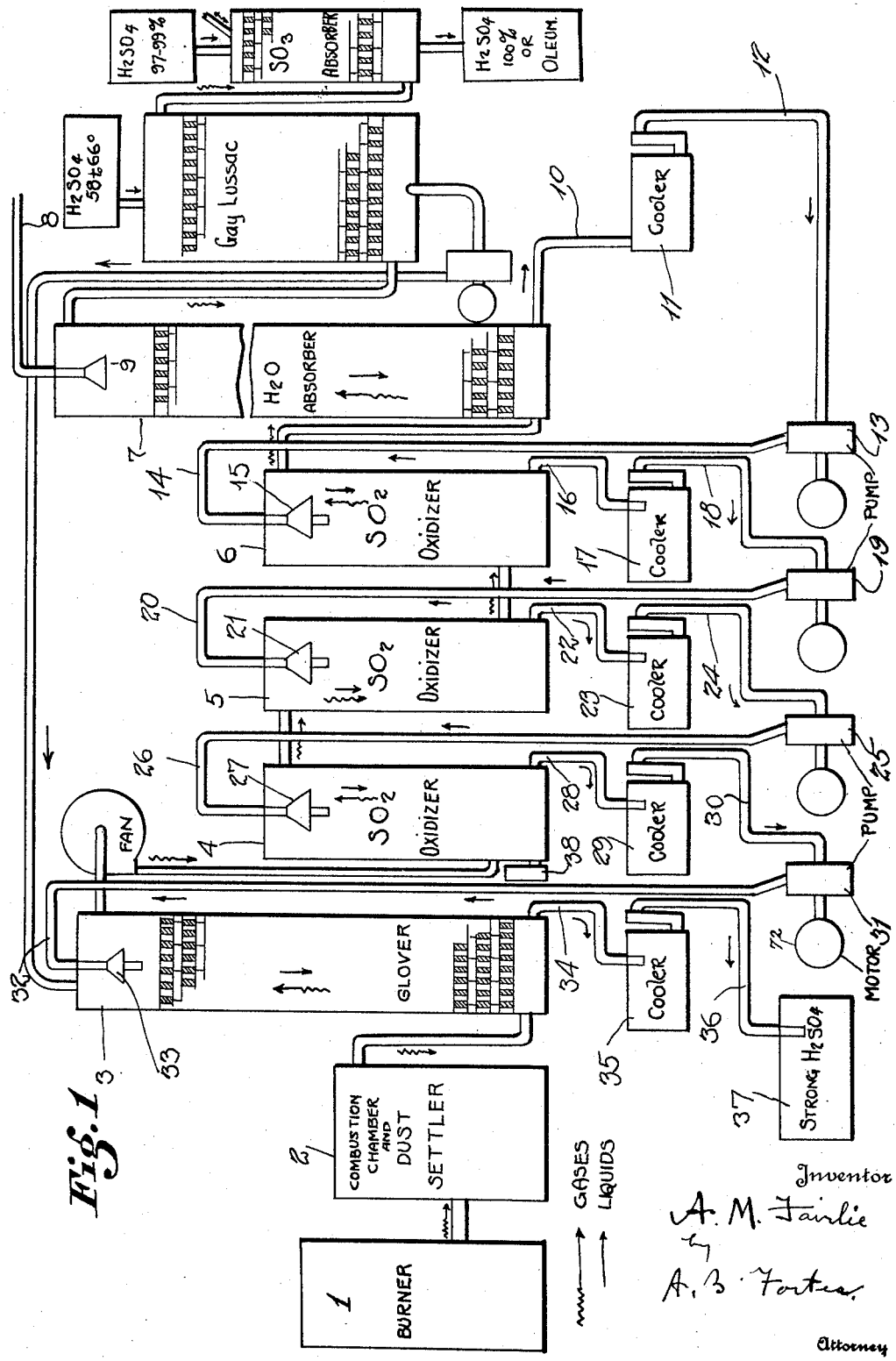

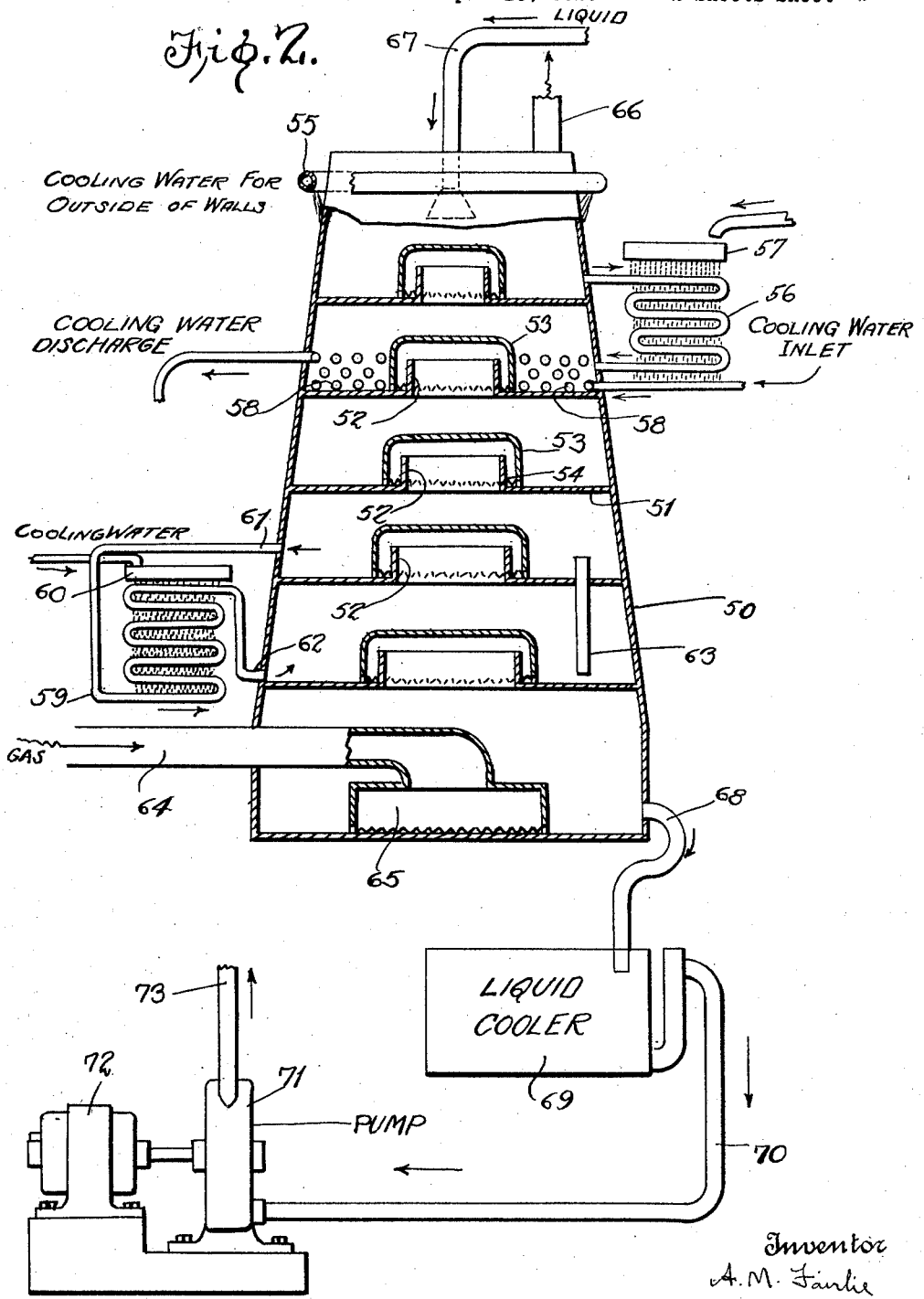

1,912,832

UNITED STATES PATENT OFFICE

ANDREW M. FAIRLIE, OF ATLANTA, GEORGIA

MANUFACTURE OF SULPHURIC ACID

Application filed September 16, 1926. Serial No. 135,863.

This invention relates particulary to the manufacture of sulphuric acid by means of nitrogen compounds as distinguished from purely catalytic methods. This invention is in some respects an improvement upon the invention disclosed in my U. S. Patent No. 1,420,477 Reissued Aug. 23, 1927, No. 16,709 on the recovery of oxides of nitrogen in sulphuric acid manufacture. The said patent describes the recovery of nitrogen oxides present in the exit gases of sulphuric acid manufacture by removing substantially all of the sulphur dioxide therefrom, thereafter oxidizing the lower oxides of nitrogen, and absorbing the latter in any suitable medium, for example in water, to produce nitric acid. Said patent moreover points out the possibility, by means of this process, of eliminating from a sulphuric acid plant the conventional sulphuric acid-fed Gay-Lussac tower, substituting therefor a tower, or series of towers, fed with water, for the production of nitric acid, this latter product replacing the nitrous vitriol which is the product of the Gay-Lussac tower. The possibility of using the nitric acid, so produced by absorption, in the sulphuric acid process, in a sulphuric acid plant for the manufacture of sulphuric acid, is likewise disclosed in said patent. The present invention embraces a particular method of using the nitric acid recovered from the exit gases of sulphuric acid manufacture as referred to above, together with modifications thereof, for the production of sulphuric acid.

Briefly, this method consists in bringing nitric acid in an extremely finely divided state, or forcibly, into direct and intimate contact with sulphur dioxide for the production of sulphuric acid. One object of this invention is, by intensifying the reaction involving the oxidation of sulphur dioxide within a given space, to reduce substantially the cost of a sulphuric acid plant and to reduce the space occupied by it, as well as the time required for the manufacture of sulphuric acid.

After the Glover tower, I preferably locate a series of $SO_2$-oxidizers, preferably of tower-like form. Instead of packed towers, in this part of the present process, I prefer to use for the most part unpacked towers, or unpacked enclosed gas-containing spaces of convenient dimensions, whether they be in the shape of towers or otherwise, and I prefer to contact the nitric acid or mixture of sulphuric and nitric acids with sulphur dioxide in such enclosed spaces in a more or less finely divided condition, as by means of atomizers, or by revolving drums partially immersed in a bath of acid, or by a centrifugal machine, or by any means whereby the nitric acid may be sprayed, showered, centrifuged or atomized in the form of fine particles, thin film, or mist, into direct contact with the stream of moving sulphur dioxide-containing gas. Or I may bubble or otherwise force the gases through the liquid, with a glass blower or exhauster, or by means of one or more agitators in motion, or I may use both bubbling and spray, or any other combination of means for intimately mixing liquid with gas. The gas and liquid may be so vigorously agitated together in some cases, as to produce a foam or froth or emulsion. Such enclosed gas-containing spaces I call "$SO_2$-oxidizers". I may use a number of units of such $SO_2$-oxidizers and I may pass the acid forward from one to another of these units in a general direction counter-current to the direction of gas flow. Within any $SO_2$-oxidizer, the liquid may go with, or against, or across the direction of gas flow. I also preferably cool the acid discharged from one unit before supplying it to another (this step being applied to all or to some only of the $SO_2$-oxidizers) and I may re-circulate all or part of the acid discharged from a unit, with or without intermediate cooling, into the same unit from which it came. I may also apply external (or extraneous) water-cooling to all or some of the $SO_2$-oxidizers. The term "external water cooling" (or "extraneous water cooling") as used herein is intended to embrace cooling the gases, vapors, liquids or mixtures present, by withdrawing heat from the same, for example by applying, (say spraying) the cool liquid to the outside of the $SO_2$-oxidizers, or immersing them in water or by providing water jackets thereon or providing suitable piping within such receptacles, through which cool water or other cooling fluid is passed.

It will be understood that these devices, and all the devices which come into contact with $HNO_3$ or liquids containing substantial amounts of $HNO_3$, are preferably made of material resistant to $HNO_3$ or are provided with a lining of suitable resistant material. Towers may be made of chemical stoneware, masonry, terra cotta, or may be of lead, and this latter may or may not be lined with a suitable acid proof brick or tile laid in acid proof cement or mortar, but I prefer to make the towers or other elements referred to, and if desired also the agitators therein, of acid-resistant high silicon alloys of iron. "Duriron", a material of this general character is suitable. Such iron alloys have the advantage of being good conductors of heat, which makes cooling by spraying the outside of the apparatus with cold water, or cooling by surrounding water jackets, far more efficient than would be the case when using apparatus made of acid-proof masonry or with acid resisting brick linings.

I call attention to the fact that lead is much less subject to attack by cool or cold nitric acid than by hot nitric acid, and therefore it is feasible, by means of my device of cooling extraneously or externally, the $SO_2$-oxidizers, by the application of cool water, to use lead or an acid-resistant lead alloy, or metal coated with lead, for the construction of the walls or shell of the $SO_2$-oxidizers, because the gases and liquids therein, are maintained at a relatively low temperature by means of the water cooling. Some of the $SO_2$-oxidizers, for example the earlier ones, where the sulphuric acid concentration is high and the nitric acid concentration is low, may even be constructed of iron, or of some iron alloy resistant to the action of relatively strong sulphuric acid. Likewise, some of the $SO_2$-oxidizers, for example the later ones, may be constructed of chromium-iron alloy, or chromium-plated or chromium-coated metal, or with some other iron alloy resistant to the action of relatively strong nitric acid. Materials of the kind mentioned may be used for the construction of flues, conduits, pipes, pumps, tanks, coolers, fans, etc., for conveying, elevating, containing, cooling or moving gases or liquids, the character of the material being in each case appropriate to the concentration of sulphuric and nitric acids whose action has to be withstood. For the construction of the absorption apparatus for the recovery of the nitrogen compounds in the form of nitric acid, either acid proof masonry, or acid-proof masonry linings, or Fe-Si alloys, or Fe-Cr alloys, for example, would be suitable, but for this purpose lead or lead-lined apparatus would not be very suitable, unless cooled to a low temperature.

While the acid-gas contacting space first entered by the $SO_2$-gas may be unpacked, I prefer to have this first space packed, and to operate it as a Glover tower, in combination with subsequent unpacked $SO_2$-oxidizers sprayed or showered internally with acid, as previously described. My Glover tower however, is supplied, not with chamber acid and nitrous vitriol, as is usual, but with a mixture of acids derived from the $SO_2$-oxidizers referred to, consisting of the sulphuric acid made in said $SO_2$-oxidizers together with such residual nitric acid as has not been decomposed by contact with sulphur dioxide. But the Glover tower might be omitted entirely, especially where the sulphur-dioxide-containing gases are relatively cool.

Instead of revolving a drum or paddle wheel partially immersed in acid, the shell of the reaction space itself may be revolved, and in such case the rotating shell may be provided on the inside with ridges, blades, buckets or other devices designed to lift liquid from the bottom of said shell, and discharge said liquid in a more or less finely divided state, downwardly into the stream of moving sulphur-dioxide-containing gas. Or a liquid containing nitric acid may be vigorously mixed or agitated with a gas mixture containing sulphur dioxide by means of a rotating propeller, or by compressed air or gas, or by any mechanical means for intimately and forcibly mixing liquid with gas.

In all modifications of this method of manufacturing sulphuric acid, I contemplate that the nitric acid recovered at the rear end of an acid plant shall be passed forward and used for the manufacture of sulphuric acid in a sulphuric acid plant, preferably in the same plant at which it is recovered.

Inasmuch as the recovery of nitrogen-oxygen compounds in water, in accordance with any known process, is less than 100 per cent of the nitrogen-oxygen compounds used in the manufacture of sulphuric acid, the deficiency must be supplied from some outside source, and this is done by any of the usual methods, as by potting nitrate of soda, by spraying a solution of nitrate of soda, or nitric acid, by oxidation of ammonia gas, etc. The loss of nitrogen-oxygen compounds can be reduced in the present process, to a very low figure. The nitrogen compound added to make good the loss may be introduced at any part of the sulphuric acid plant, e. g. Glover tower, $SO_2$-oxidizers or nitrogen-oxid absorbers.

In the drawings Fig. 1 illustrates diagrammatically in elevation a preferred mode of carrying out this invention; but the invention is of course not limited to the particular modification here illustrated. In Fig. 1 of the drawings the flow of gas and liquid is clearly indicated by the sequence of the numbers. In said figure the gas connections are shown by arrows, by way of example, as follows: The sulphur dioxide is generated in the burner or roaster, pyritic smelting furnace, etc., and mixed with oxygen, or oxygen and nitrogen, flows successively through the combustion chamber or dust settler 2, the Glover tower 3, the $SO_2$-oxidizers 4, 5 and 6, where the last of the sulphur dioxide is (under normal conditions) oxidized, and finally the residual gases flow through the absorption tower 7. In Fig. 1, a fan or blower is shown in the flue between the Glover tower and first $SO_2$-oxidizer, but this (or several blowers if desired) may be located at various points in the apparatus. The supply of absorption liquid to the process is introduced first into that part of the apparatus which is reached by the gas last. Into the absorption tower 7 is introduced water through pipe 8 and atomizer or distributor 9. The nitrogen-oxygen compound added to make good the loss may be added here, along with the water, if desired. Hence this invention is not limited to the use of pure water for the absorption of the nitrogen-oxygen compounds discharged from the final $SO_2$-oxidizer, but comprises the use of any aqueous liquid containing sufficient water to form nitric acid with nitrogen-oxygen compounds. It is to be noted that even if pure water be introduced initially into absorption apparatus 7, said water, at the first contact with the effluent gases, is no longer pure, but contains some nitric acid, and the concentration of the nitric acid in the aqueous liquid increases as the latter proceeds through the absorption apparatus; and the aqueous liquid may also absorb some sulphur compounds from the effluent gases, such as sulphuric acid, and yet such aqueous liquid may continue to be an efficient absorbing agent for nitrogen oxides. Coming into direct contact with nitrogen oxides discharged from the final $SO_2$-oxidizer 6, the water in the absorption tower 7 reacts therewith to form nitric acid:

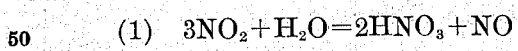

(1)  $3NO_2 + H_2O = 2HNO_3 + NO$

The NO is oxidized, by air present and in absence of $SO_2$, to higher oxides $N_2O_3$, $NO_2$ etc., thus, e. g.

(2)  $2NO + O_2 = 2NO_2$

To permit time for a satisfactory absorption of the nitrogen oxides, the absorption tower 7 is preferably packed, though not necessarily so. A sprayed or showered or centrifugal or bubbling gas-liquid contacting space unpacked, of any convenient shape or size, may be used for the absorption of the nitrogen oxides, and the absorption apparatus for contacting the nitrogen oxides with absorbing liquid may consist of one unit or of two or more units, as desired. In the illustration, for simplicity, only one unit is shown. The absorption apparatus may be water-cooled externally or extraneously, if desired. The liquid discharged from the absorber 7, relatively strong in nitric acid content (say 15 to 45% $HNO_3$) flows through pipe 10 to cooler 11, thence through pipe 12 to pump 13, by which it is elevated through pipe 14 to atomizer or distributor 15, in $SO_2$-oxidizer 6, where a part of the nitric acid is reduced in the oxidation of the last of the sulphur dioxide. From $SO_2$-oxidizer 6, the liquid, now somewhat less strong in nitric acid, and containing already some sulphuric acid, flows through pipe 16 to cooler 17, thence through pipe 18 to pump 19, by which it is elevated through pipe 20 to distributor, say atomizer 21 in $SO_2$-oxidizer 5, where a larger proportion of the nitric acid is reduced, owing to the greater concentration of sulphur dioxide in the gas mixture of $SO_2$-oxidizer 5 than in that of $SO_2$-oxidizer 6. The liquid discharged from $SO_2$-oxidizer 5, now less concentrated as to nitric acid and more concentrated as to sulphuric acid, flows through pipe 22 to cooler 23, thence through pipe 24 to pump 25, by which it is elevated through pipe 26 to atomizer or distributor 27 in $SO_2$-oxidizer 4, where a still larger proportion of the nitric acid is reduced, on account of coming into direct contact with a gas mixture still more highly concentrated as to sulphur dioxide content. The liquid discharged from $SO_2$-oxidizer 4, with relatively low nitric acid concentration flows through pipe 28 to cooler 29, thence through pipe 30 to pump 31, by which it is elevated through pipe 32 to atomizer or distributor 33 in Glover tower 3, where the last of the nitric acid is driven off and reduced to oxides of nitrogen, chiefly nitric oxide (NO), nitrogen dioxide ($NO_2$), nitrogen tetroxide ($N_2O_4$) or nitrogen trioxide (nitrous anhydride, $N_2O_3$), and the sulphuric acid is concentrated by the hot sulphur-dioxide-containing gases from the combustion chamber 2 and the burner 1. The concentrated sulphuric acid, approximately free from nitric acid or nitrogen compounds, flows from tower 3 through pipe 34 to cooler 35, thence through pipe 36 to storage tank 37. To compensate for the incomplete absorption of nitrogen-oxygen compounds in absorber 7, a supply of oxides of nitrogen, as, for example, from an ammonia oxidizer 38, is introduced at any convenient part of the plant, for instance into $SO_2$-oxidizer 4.

In some cases the amount of liquid required for the absorption of nitrogen oxides may be in excess of that desired for the purpose of hydration, and in such case a part of the liquid discharged from an absorber may be re-circulated over the same absorber, another part being passed forward in the acid-making apparatus, as has been described. Similarly, the liquid discharged from an $SO_2$-oxidizer may be in part recirculated through the same $SO_2$-oxidizer and in part passed forward to another $SO_2$-oxidizer, if desired. The nitrogen oxides may be absorbed partly in water and partly in sulphuric acid, if desired, and the sulphuric acid treatment may either precede or follow the water treatment, or there may be alternately a sulphuric acid treatment, then a water treatment, then another sulphuric acid treatment, and this alternation may continue as far as desired. The discharged liquids would be nitric acid or mixed nitric and sulphuric acids from the water treatment, and nitroso-sulphuric acid or mixed nitric and sulphuric acids with perhaps some nitroso-sulphuric acid from the sulphuric acid treatment; and these different liquids resulting from (a) the water treatment and (b) the sulphuric acid treatment, may be either mixed and the mixture brought into direct contact with sulphur dioxide, as previously described, or they may be kept separate and brought into such direct contact separately, or the liquid from the sulphuric acid absorption may flow directly to the Glover tower.

In addition to the oxidation of $SO_2$ by $HNO_3$, it will be understood that the ordinary chamber reactions take place in the present process, i. e.

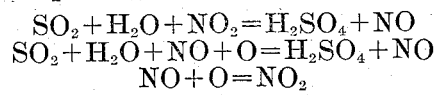
$$SO_2+H_2O+NO_2=H_2SO_4+NO$$
$$SO_2+H_2O+NO+O=H_2SO_4+NO$$
$$NO+O=NO_2$$

These reactions or certain of them are stated here in a simple manner but the actual reactions taking place may be somewhat more complicated. The following reaction (stated in a simple manner) also forms an important part of the present case:

$$2HNO_3+3SO_2+2H_2O=3H_2SO_4+2NO$$

The following reaction also may play an important part in the process—

$$2HNO_3+3SO_2=H_2SO_4+2SO_3+2NO$$

In the construction of a plant for the operation of this process, while lead may be used, materials more resistant to the action of nitric acid than lead should preferably be used, for apparatus designed to come into contact with nitric acid. Especially suitable is high-silicon cast iron, e. g. that called "Duriron". In the process here described, water for the purpose of hydration may be used much more sparingly than in the usual lead chamber process where an excess of water is purposely added to avoid the corrosive effect of hot strong sulphuric acid and of "chamber crystals" on lead. Therefore, liquid discharged from the first $SO_2$-oxidizer (referring to the drawings, from $SO_2$-oxidizer 4), may be already sulphuric acid as strong as that which is usually discharged from the Glover tower (approximately 58.1° to 62° Bé.=74.5 to 81.3% $H_2SO_4$), and in my process the acid discharged from the Glover tower may be of 66° Bé. strength, or even stronger, by limiting the amount of water admitted to the $SO_2$-oxidizers sufficiently to produce therein acid of the usual Glover-exit strength, thereafter supplying to the Glover tower, such acid, already at that concentration which in the hitherto-known nitration processes is attained only as the acid is about to be discharged from the Glover tower. With this process, therefore, it is possible to produce sulphuric acid of a strength higher than ever before commercially attained by a nitration process, without auxiliary equipment (concentrators heated by fuel). The highly concentrated sulphuric acid thus produced may be utilized, if a part of the nitrogen oxides are recovered in sulphuric acid, by feeding to a Gay-Lussac tower, and this is advantageous, because sulphuric acid of 66° Bé. strength or stronger is a more efficient absorber of nitrogen oxides than sulphuric acid of 60 or 61° Bé.

In the operation of this process, I do not limit myself to the customary quantity of nitrogen compounds (including therein the reclaimed nitrogen compounds from the niter-absorption apparatus as well as the new nitrogen compounds introduced to compensate for niter losses) in proportion to sulphur burned (approximately that quantity equivalent to one part of nitric acid to eight or ten parts of sulphur dioxide, by weight admitted into $SO_2$-oxidation apparatus per unit of time). On the contrary, I prefer to use a much higher concentration of nitrogen compounds than is customary in the gas mixture inside the $SO_2$-oxidation apparatus, in order to obtain a higher intensity of reaction. I may use any desired proportion of nitrogen oxides to sulphur burned per unit of time, from the proportion equivalent to one pound of nitric acid to five pounds sulphur dioxide admitted into the $SO_2$-oxidation apparatus per unit of time, up to many times that proportion. The external (or extraneous) water-cooling of the $SO_2$-oxidizers is important in this phase of the process.

By eliminating the Glover tower, I may use relatively cool sulphur dioxide gas, and since, in this process, hot gas is not essential for concentrating sulphuric acid to 60° Bé. strength, the hot burner gas may be pre-cooled, and such cooling is advantageous for the precipitation of dust from the burner gas, especially in electrical precipitation apparatus, such as Cottrell dust precipitators, or so-called "treaters".

I am aware that heretofore various methods of producing sulphuric acid have been proposed and patented, in which the step of bringing into direct and forcible contact a gas mixture containing sulphur dioxide and nitroso-sulphuric acid or nitrous vitriol, finely divided or comminuted, has been utilized, the nitrogen oxides being recovered as usual exclusively in sulphuric acid-fed Gay-Lussac towers. I am aware also that high proportions of nitrogen oxides to sulphuric oxides have been proposed and patented, applied to tower processes operated with nitroso-sulphuric acid or nitrous vitriol produced in the usual manner in Gay-Lussac towers fed with sulphuric acid. All of these prior processes have been unsuccessful or ineffective for a number of reasons: First, the nitrous vitriol, being a solution of nitroso-sulphuric acid ($SO_2.OH.ONO$) in sulphuric acid, is not the highest liquid oxidation product of nitrogen, and therefore cannot be the most effective liquid agent for oxidizing $SO_2$; second, nitrous vitriol ordinarily contains 1% or at most not more than 2% $N_2O_3$ (equivalent to about 1.7 to 3.3% $HNO_3$) and therefore must be considered very dilute as to content of oxidizing agents; third, nitrous vitriol is a viscous liquid, and is not easily comminuted, or divided into minute droplets; fourth, for a satisfactory absorption of nitrogen oxides in a Gay-Lussac tower, without a preliminary water treatment of the exit gases, a small percentage of $SO_2$ in the exit gases is necessary, and this must be nicely adjusted, as explained in my U. S. Patent No. 1,205,723, and as this nice adjustment is impossible when the gases pass entirely through the acid-making apparatus in from two to fifteen minutes (as they do in these processes here referred to) the absorption of nitrogen oxides in these prior processes has not been satisfactory, and in consequence of the high niter losses these prior processes have not attained good repute. In my process all of these deficiencies are eliminated. Instead of nitrous vitriol, I use, as the agent for oxidizing $SO_2$, chiefly $HNO_3$. Nitric acid is the highest liquid oxidation product of nitrogen, therefore the most powerful oxidizing agent. Nitric acid of from 15 to 45% $HNO_3$ can be produced in my absorption apparatus, therefore my oxidizing agent is from five to fifteen times as concentrated as the strongest nitrous vitriol. Nitric acid is relatively limpid, as compared with nitrous vitriol, therefore can be easily comminuted into fine droplets or mist. No nice adjustment of $SO_2$ percentage in the exit gases is necessary, for absorption of the nitrogen-oxygen compounds in water; all that is required is the complete elimination of $SO_2$, and if this is not done in the last $SO_2$-oxidizer, it will be done instantly when the exit gases enter the first absorption unit by the stronger $HNO_3$ therein. Therefore gases may pass entirely through my sulphuric acid manufacturing apparatus in one minute, more or less, with a satisfactory recovery of nitrogen compounds in my absorption apparatus if the latter be properly designed and constructed. The step of diffusing finely divided nitric acid in the liquid phase into sulphur dioxide in the gaseous phase, or the reverse (diffusing finely divided sulphur dioxide in the gaseous phase into nitric acid in the liquid phase), with absorption of resultant nitrogen compounds in water to produce nitric acid, constitutes a new process which achieves a variety of results never before commercially attained, so far as I am aware.

The $SO_2$-oxidizers herein described and constituting a part of this invention may be used in combination with any other type of apparatus for the oxidation of sulphur dioxide, such as lead chambers (air-cooled or water-cooled), or packed towers or bubbling devices, or chambers, towers, flues, boxes or other apparatus equipped with acid sprayers or atomizers, or with revolving drums or other devices for showering, spraying, atomizing or centrifuging acid, or in combination with a contact-process sulphuric acid plant. My $SO_2$-oxidizers can be used to advantage between lead chambers of the well known box type, to increase the capacity of an existing plant, or otherwise to improve the economy of operation.

I have above referred to tower-like form, for the Glover tower, $SO_2$-oxidizers, water absorbers, Gay-Lussac towers and $SO_3$ absorbers. It is not essential that these be vertical walled towers, although such may be used. In Fig. 2 of the drawings I have shown a water-cooled tapering column or tower which is illustrated more in detail, this form of device being especially recommended for the $SO_2$ absorbers. The device consists of a tapering-walled tower-shaped device 50 having a number of superposed plates 51 carrying up-standing wide gas pipes 52, surmounted by hoods or covers 53, the latter having serrated lower edges 54 if desired.

The said figure shows a number of alternative means of cooling and one or several of such cooling means may be employed.

At 55 is shown a ring-shaped pipe perforated, surrounding the upper part of the said tower, for spraying cooling liquid upon the outer surface of the said tower.

At 56 is shown a means for withdrawing liquid from the uppermost compartment into the compartment next below, this means 56 being in the form of a coil, and above the same may be placed means 57 for delivering a spray of cooling water upon said coil. In the next compartment below this, I have illustrated a coil of pipes 58 located within the said compartment, surrounding the cap 53, cool water being passed through this coil from any suitable source.

At 59 is shown another cooling coil located outside of the tower, this being so arranged that the greater part of the coil will at all times be full of the acid being cooled, and hence providing very efficient cooling, for the amount of cool water sprayed from the device 60. The inlet to this coil, 61, is preferably located a little below the level of the top of the upstanding gas flue 52, and the termination of this coil, at 62 being located above or below the level of the top of the gas flue 52 in the next compartment below.

There may be provided, if desired, simply the vertical pipes 63, in the several compartments.

64 illustrates the pipe bringing the gas into the device 50, this being provided with a distributor 65, which may be stationary and which may be serrated at its bottom. The pipe 66 represents the gas outlet, and the pipe 67 represents the inlet for liquid. The liquid may flow off from the lowermost compartment through pipe 68 into a cooler 69, then through pipe 70 into pump 71, operated by motor 72, the liquid then being elevated through pipe 73 to any suitable point. In Fig. 2 the parts 71 and 72 are shown on a somewhat enlarged scale, to make the same clearer.

I have referred above to the limitation of the amount of water introduced into the system, whereby highly concentrated sulphuric acid, say 66° is discharged from the Glover tower.

In accordance with one modification of the present invention, I may further restrict the amount of water present in the $SO_2$-oxidizers, even to such an extent that a considerable quantity of the oxidized $SO_2$ will exist in the form of $SO_3$ vapor or fume, and I may carry said gases and fumes through the system as above described the oxides of nitrogen being absorbed in the water absorbers to form nitric acid, and the residual oxides of nitrogen being absorbed in the sulphuric acid, say of about 60° Bé. if the Gay-Lussac tower is used. It will be understood that neither water nor sulphur acid of this strength acts as a good absorber for $SO_3$, and the $SO_3$ can thereafter be absorbed from the remaining gases in sulfuric acid, say of 98 to 99% strength, to produce mono-hydrate acid, fuming sulphuric acid or oleum. Such an oxidation of $SO_2$ to $SO_3$, in the presence of nitric acid would be entirely feasible, on account of the extremely high oxidizing activity of the nitric acid, as compared with other nitrogen compounds ordinarily used in the chamber process of making sulphuric acid, such as nitric oxide, nitrogen tri-oxide, nitrogen peroxide, nitroso-sulphuric acid and the like, and the production of $SO_3$ by this means is exemplified in one of the chemical equations cited above.

In this process it will be observed: (1) That the same water used for absorption of the nitrogen oxides may serve later as the sole means of hydration of the oxidized sulphur dioxide to form sulphuric acid; and that the usual hydration apparatus, water atomizers, etc., may thus be eliminated; (2) that the nitric acid formed in the absorber of the sulphuric acid plant is passed forward in counter-current to the direction of gas flow, and in a finely divided state is brought into direct and forcible contact with a gas mixture containing an ever-increasing percentage of sulphur dioxide; (3) that the water, after entering the absorber, meets a gas mixture containing an ever-increasing percentage of nitrogen oxides up to the point where the sulphur dioxide is first encountered; (4) that water, fed into the plant at the rear, may serve a multiple purpose, first as absorber of nitrogen oxides, then simultaneously, as $SO_2$-oxidizer and as hydrator of sulphur-oxygen compounds, and finally escapes from the front as sulphuric acid; (5) that a gas mixture containing sulphur dioxide enters a sulphur acid plant at the front, traverses its entire length meeting continuously a liquid containing an ever-increasing percentage of nitric acid, the weakest concentration of sulphur dioxide encountering the strongest concentration of nitric acid; (6) that since the complete oxidation of sulphur dioxide is obligatory to obtain a satisfactory absorption of nitrogen oxides in water, there is no escape of sulphur dioxide from the exit stack, and a sulphuric acid recovery substantially equivalent to 100 per cent of the sulphur burned is assured; (7) that since the nitric acid used in this process performs its oxidizing action chiefly in the $SO_2$-oxidizers, there is but little denitration for the Glover tower to do, and the Glover exit acid is virtually free from nitrogen compounds; (8) that by limiting the amount of water admitted to the $SO_2$-oxidizers, sulphuric acid may be made in this equivalent of the lead chambers as strong as that discharged from the Glover tower of any other nitration process; (9) that by feeding to the Glover tower acid of ordinary Glover tower discharge strength, sulphuric acid of 66° Bé. 98% $H_2SO_4$, or even monohydrate acid, may be produced in the Glover tower, an effect often before claimed, by other means, but never before actually achieved in practice; (10) that by limiting the amount of water admitted to the $SO_2$-oxidizers to an amount less than that necessary to combine with all of the $SO_3$ produced, gaseous $SO_3$ may be passed rearwards along with the gases leaving the $SO_2$-oxidizers, and such $SO_3$ may be thereafter absorbed in sulphuric acid of 98–99% strength for the production, at a nitration-process plant, of monohydrate or fuming sulphuric acid.

I claim:—

1. A process for the manufacture of sulphuric acid which comprises intimately and vigorously contacting a gas mixture containing sulphur dioxide with a liquid containing nitric acid while removing the heat of reaction by means of cooling liquid; continuing such contacting until the sulphur dioxide is substantially completely oxidized, thereafter absorbing at least part of the resultant nitrogen oxides in aqueous liquid to form nitric acid.

2. A process for the manufacture of sulphuric acid comprising the following steps: passing a gas mixture containing sulphur dioxide into direct contact with acid in a packed Glover tower, then contacting the resultant gases vigorously with liquid containing nitric acid while removing the heat of reaction by means of cooling liquid until the sulphur dioxide is substantially completely oxidized, then treating the resultant gases with aqueous liquid to form nitric acid, then contacting the residual gases with sulphuric acid.

3. A process for the manufacture of sulphuric acid comprising the following steps: passing a gas mixture containing sulphur dioxide into direct contact with acid in a packed Glover tower, then vigorously contacting the resultant gases with liquid containing nitric acid while removing the heat of reaction by means of cooling liquid, until the sulphur dioxide is substantially completely oxidized, then treating the resultant gases with sulphuric acid, then with water, then with sulphuric acid.

4. In the manufacture of sulphuric acid, the process of passing forward nitric acid produced in a nitrogen oxide absorber of a sulphuric acid plant, in counter-current to the direction of gas-flow beginning with the last $SO_2$-oxidizer of a series of the same, cooling the liquid discharged from each $SO_2$ oxidizer and contacting said nitric acid vigorously with a gas-mixture containing an increasing percentage of sulphur dioxide, as said cooled liquid proceeds towards the front of a sulphuric acid plant, while removing heat of reaction by means of cooling liquid extraneously applied to at least one such $SO_2$-oxidizer.

5. The herein described method of producing, at a nitration-process sulphuric acid plant, sulphuric acid containing more than 74.4 per cent of $H_2SO_4$, comprising the step of limiting the amount of water allowed to come into direct contact with a unit quantity of a sulphur-oxygen compound to less than 25.6 per cent and more than 1 per cent in excess of the amount necessary to combine with the $SO_3$ equivalent of such unit quantity to produce $H_2SO_4$.

6. The process for making sulphuric acid, which comprises forcibly contacting together a gas mixture containing sulphur dioxide and a liquid containing nitric acid, in a proportion greater than that of one part $HNO_3$ to five parts $SO_2$, passing forward such liquid through a series of $SO_2$-oxidizers in a general direction counter-current to the flow of such gases, removing from such $SO_2$-oxidizers the heat of reaction by introducing cooled acid therein and by cooling the acid discharged therefrom, continuing the contacting of such gas mixture with such liquid until the sulphur dioxide is substantially completely oxidized, absorbing at least part of the resultant nitrogen oxides in water, and introducing into the sulphuric acid plant a quantity of nitrogen compounds sufficient to compensate for the nitrogen oxides not recovered.

7. The herein described method of recovering nitrogen oxides from a gas mixture containing the same, consisting in producing sulphuric acid containing more than 82 per cent. $H_2SO_4$, by contacting sulphuric acid containing less than 25.6 per cent. of free water produced in $SO_2$-oxidizers substantially as herein described, with a hot gas mixture containing sulphur dioxide, and then contacting at least part of the resultant concentrated acid with a gas mixture containing nitrogen oxides.

8. The process for making sulphuric acid, which comprises forcibly and intimately contacting together a gas mixture containing sulphur dioxide and a liquid containing nitric acid in a proportion greater than that of one part $HNO_3$ to five parts $SO_2$, passing forward such liquid through a series of $SO_2$-oxidizers in a general direction counter-current to the flow of such gases, removing heat from such $SO_2$-oxidizers by water-cooling the same extraneously, continuing the contacting of such gas mixture with such liquid until the sulphur dioxide is substantially completely oxidized, absorbing at least part of the resultant nitrogen oxides in water, returning such absorbed nitrogen oxides to said $SO_2$-oxidizers for the manufacture of sulphuric acid, and introducing into the sulphuric acid plant a quantity of nitrogen compounds sufficient to compensate for the nitrogen oxides not absorbed.

9. The process of manufacturing sulphuric acid which comprises forcibly and intimately contacting liquid containing nitric acid reclaimed from the spent gases at the rear of a sulphuric acid plant with a gas mixture containing sulphur dioxide, while removing the heat of reaction by means of cooling liquid, extraneously applied, to the $SO_2$-oxidation apparatus.

10. The herein-described method of producing, at a nitration-process sulphuric acid plant, sulphuric acid containing more than 82 per cent of $H_2SO_4$, comprising (a) the step of producing sulphuric acid containing more than 74.4 per cent of $H_2SO_4$ by a nitration process, by limiting the amount of water allowed to come into direct contact with a unit quantity of a sulphur-oxygen compound to less than 25.6 per cent and more than one per cent in excess of the amount necessary to combine with the $SO_3$-equivalent of such unit quantity to produce $H_2SO_4$; and (b) the step of contacting the said sulphuric acid containing more than 74.4 per cent of $H_2SO_4$, produced as described for step (a), with a hot gas mixture containing sulphur dioxide.

In testimony whereof I affix my signature.

ANDREW M. FAIRLIE.